United States Patent
Kim et al.

(10) Patent No.: US 7,253,814 B2
(45) Date of Patent: Aug. 7, 2007

(54) APPARATUS AND METHOD OF DRIVING THE VARIOUS LCD IN A COMPUTER SYSTEM

(75) Inventors: Se Hwan Kim, Incheon-si (KR); Jong Hyun Woo, Pyeongtack-si (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 10/629,542

(22) Filed: Jul. 30, 2003

(65) Prior Publication Data

US 2004/0036697 A1    Feb. 26, 2004

(30) Foreign Application Priority Data

Aug. 22, 2002   (KR) .................. 10-2002-0049634

(51) Int. Cl.
 G09G 5/00   (2006.01)
 G09G 3/20   (2006.01)
(52) U.S. Cl. .............. 345/211; 345/1.1; 345/3.1; 345/690
(58) Field of Classification Search ............ 345/1.1, 345/1.2, 3.1, 87, 903, 211, 690, 1.3
See application file for complete search history.

(56) References Cited

U.S. PATENT DOCUMENTS

| | | | | |
|---|---|---|---|---|
| 5,844,540 A | * | 12/1998 | Terasaki | 345/102 |
| 5,854,617 A | * | 12/1998 | Lee et al. | 345/102 |
| 5,969,696 A | * | 10/1999 | Stoye | 345/87 |
| 6,323,873 B1 | | 11/2001 | Liebenow | 345/619 |

FOREIGN PATENT DOCUMENTS

CN    1249499    4/2000

\* cited by examiner

*Primary Examiner*—Dennis-Doon Chow
(74) *Attorney, Agent, or Firm*—Ked & Associates, LLP (57) ABSTRACT

Disclosed is an apparatus and method for driving a plurality of displays in a computer system. The apparatus can include a checking circuit for checking inherent control information of the displays, and an output circuit for confirming a brightness control information corresponding to the inherent control information of the checked display among preset brightness control information to output an information to control the display at a brightness of the corresponding display. A conversion circuit can supply an information to drive a corresponding display based on the output information of the output circuit.

22 Claims, 11 Drawing Sheets

| Address | No. bytes | | Description | Format |
|---|---|---|---|---|
| 00h | 1 | Bytes | EDID Structure Version/Revision | Binary |
| 01h | 7 | Bytes | Vendor/Product Identification | |
| 01h | | 2 | ID Manufacturer Name | EISA 3-character ID |
| 03h | | 2 | ID Product Code | Vendor assigned code |
| 05h | | 1 | Week of Manufacture | Week number |
| 06h | | 2 | Year of Manufacture | Binary |
| 4Fh | 5 | Bytes | Display Device Description | |
| 4Fh | | 1 | Display Technology Type/Subtype | |
| 50h | | 1 | Major Display Characteristics | |
| 56h | 28 | Bytes | Color/Luminance Description | |
| 56h | | 4 | Display Transfer Characteristic (Gamma) | Binary |
| 80h | 127 | Bytes | Luminance Table & Timing Descriptions | |
| * | | x*A | Luminance Table | Size x specified in Section 4.4 |
| * | | 8*B | Range Limits | |
| * | | 27*C | 27-Byte-Detailed Range Limits | |
| * | | 4*D | 4-Byte Timing Codes | |
| * | | 18*E | 18-Byte Detailed Timing Descriptions | |
| * | | X | X=127-(x*A+8*B+27*C+4*D+18*D) | Set to 00h |

| Kind of LCD | LCD brightness control value | Control code |
|---|---|---|
| LCD #1 | Control value for output of 6 mA | 0B |
| LCD #2 | Control value for output of 5 mA | 1A |
| LCD #3 | Control value for output of 5.5 mA | 47 |
| LCD #4 | Control value for output of 4.5 mA | 15 |
| ⋮ | ⋮ | ⋮ |

APPARATUS AND METHOD OF DRIVING THE VARIOUS LCD IN A COMPUTER SYSTEM

BACKGROUND OF THE INVENTION

1. Field of the Invention

The present invention relates to an apparatus and method for driving a plurality of displays.

2. Background of the Related Art

Generally, a portable electronic device such as a notebook is provided with an LCD as a display. The standard panel working group (SPWG) established industrial standard panels (ISP) that provide standards for dimensions of LCD, interface and the like, and advises the ISP so that the developing time interval can be reduced between notebook computer manufacturers and LCD manufacturers and the LCD information can be shared with each other.

In the aforementioned ISPs, EEDID (Enhanced Extended Display Identification Data) information includes data such as manufacturing date, manufacturer, kind and the like, and is provided as a reference for controlling the brightness of each LCD. Each LCD stores its EEDID information. In other words, it is possible to use the EEDID information as the identification information of the LCD.

The brightness control of the LCD is performed by the micro controller or system BIOS. The micro controller or system BIOS controls the brightness of the LCD by controlling an inverter that outputs a driving current of the LCD based on a brightness table set in advance.

However, in the brightness control of a portable electronic device having a plurality of LCDs, an LCD driving current outputted from the inverter is applied to the plurality of LCDs having a variety of optical characteristics at the same level. Accordingly, the brightness may be different depending on the kinds of the LCDs.

A portable electronic device can be using as many as ten kinds or types of LCDs. Thus, in order to satisfy the optical features of various LCDs, it is necessary to develop an inverter specifically for each LCD or develop a variety of inverters as many as the LCD types. As described above, the related art portable electronic devices have various disadvantages. The related art devices can cause loss in developing costs, low productivity, difficulty in after services, etc.

The above references are incorporated by reference herein where appropriate for appropriate teachings of additional or alternative details, features and/or technical background.

SUMMARY OF THE INVENTION

An object of the invention is to provide an apparatus and method for driving displays that substantially obviates one or more problems caused by limitations and disadvantages of the related art.

Another object of the present invention is to provide an apparatus and method for driving a plurality of displays in which the brightness of a variety of displays such as liquid crystal displays (LCDs) having different optical properties are controllable by using information of the respective LCDs.

Another object of the present invention is to provide an apparatus and method for driving a plurality of LCDs of a computer system, of which brightness are controllable at different levels by a single inverter.

Another object of the present invention is to provide an apparatus and method for driving a plurality of LCDs of a computer system, of which brightness are controllable at different levels by a single inverter based on brightness control information of the usable LCDs or a specific LCD and correction coefficients thereof, so that the brightness levels of the LCDs are equally controlled.

To achieve at least these objects and other advantages in a whole or in part and in accordance with the purpose of the invention, as embodied and broadly described herein, there is provided an apparatus for driving a plurality of displays that includes a power identifying device for identifying powers used in a system or the display to output a signal depending on the discriminated power, memory device for storing inherent control information of the display, checking device for checking the inherent control information of the display, output device for confirming a brightness control information corresponding to the inherent control information of the checked display among preset brightness control information to output an information to control the display at the brightness of a corresponding display, the output device being a system BIOS and a conversion device for supplying an information to drive a corresponding display based on the output information of the output device.

To further achieve the above objects in a whole or in part and in accordance with the purpose of the invention, as embodied and broadly described herein, there is provided a method for driving a plurality of displays that includes confirming inherent control information of a display intended to use, retrieving the brightness control information corresponding to the confirmed display among one or more prescribed brightness control informations and variably controlling the brightness of the corresponding display by using the retrieved brightness control information.

To further achieve the above objects in a whole or in part and in accordance with the purpose of the invention, as embodied and broadly described herein, there is provided a method for driving a plurality of displays that includes storing brightness control information for a specific display in a memory, storing in the memory one or more correcting coefficients for respective displays corresponding to the brightness control information for the specific display, when a display is equipped, identifying a corresponding display by using inherent information of each display of the plurality of displays, and applying the correcting coefficient for the identified display using the brightness control information to output brightness information and controlling brightness of the equipped display by using the brightness information.

To further achieve at least these objects and other advantages in a whole or in part and in accordance with the purpose of the invention, as embodied and broadly described herein, there is provided a computer system that includes a display device, a controller configured to determine brightness control information corresponding to a display type of the display device among preset brightness control information for each of a plurality of display types for driving the display device.

According to the present invention, brightness of a various kinds of LCDS are controllable at different levels by a single inverter based on brightness control information of the usable LCDs or a specific LCD and correction coefficients thereof, so that the brightness levels of the LCDs are controlled. As a result, the invention provides portable computer systems with power saving effect that is very important factor in the portable computer systems.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
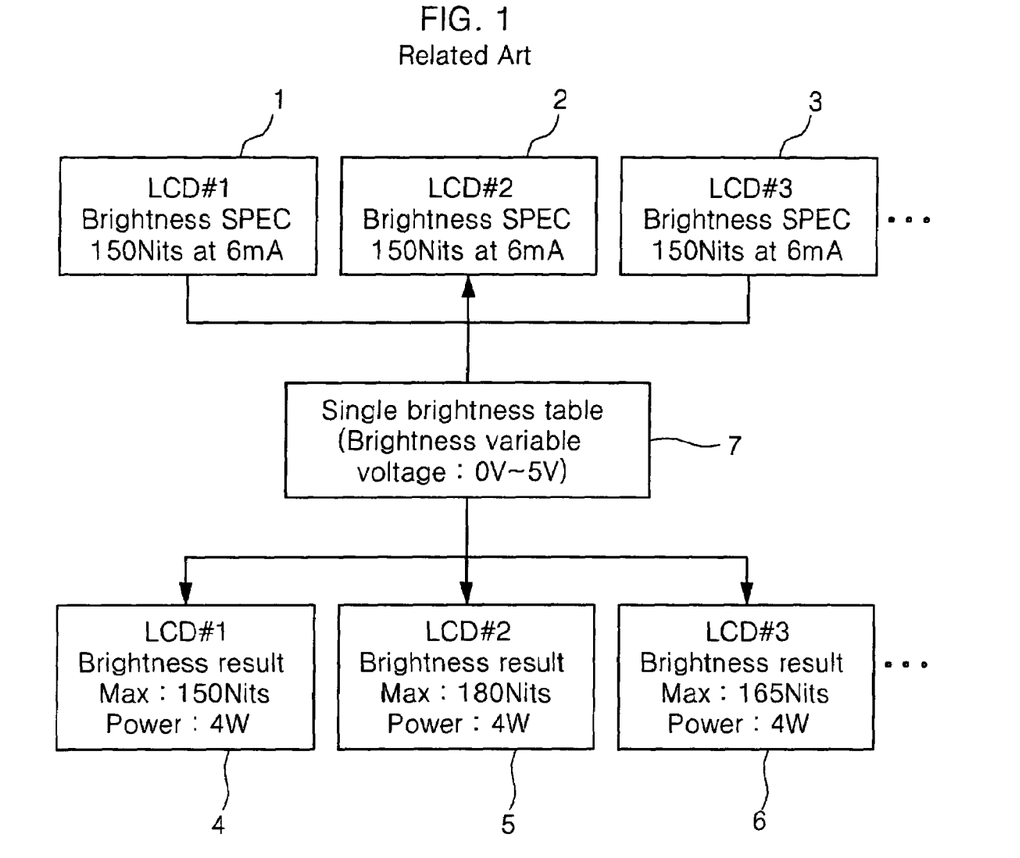
FIG. 1 is a block diagram schematically illustrating a related art driving method for a plurality of LCDs.

FIG. 1 schematically illustrates the brightness control operation of a variety of LCDs (e.g., types or manufacturers). As shown in FIG. 1, in order to allow LCDs to have the same brightness level of 150 nits, a first LCD 1 needs a driving current of 6 mA, a second LCD 2 needs 5 mA, and a third LCD needs 5.5 mA. In spite of such differences in the necessary driving current levels (e.g., at 150 nits), under the existing standards, the same driving current is supplied to each the LCDs 1, 2 and 3 according to a brightness table 7 used as the standard for the brightness control. As a result, the first to third LCDs show brightness results of 150 nits, 180 nits, 165 nits that are different one another at the same power level (e.g., 4 W).

Also, in case the LCDs are designed according to a brightness specification, the LCD having the lowest brightness elected as the design reference. To this end, other LCDs show brightness higher than those regulated in the specification. Considering that the LCD backlight occupies the highest position in terms of the power consumption of the device, such a design causes power to be wasted unnecessarily.

Figure 2:
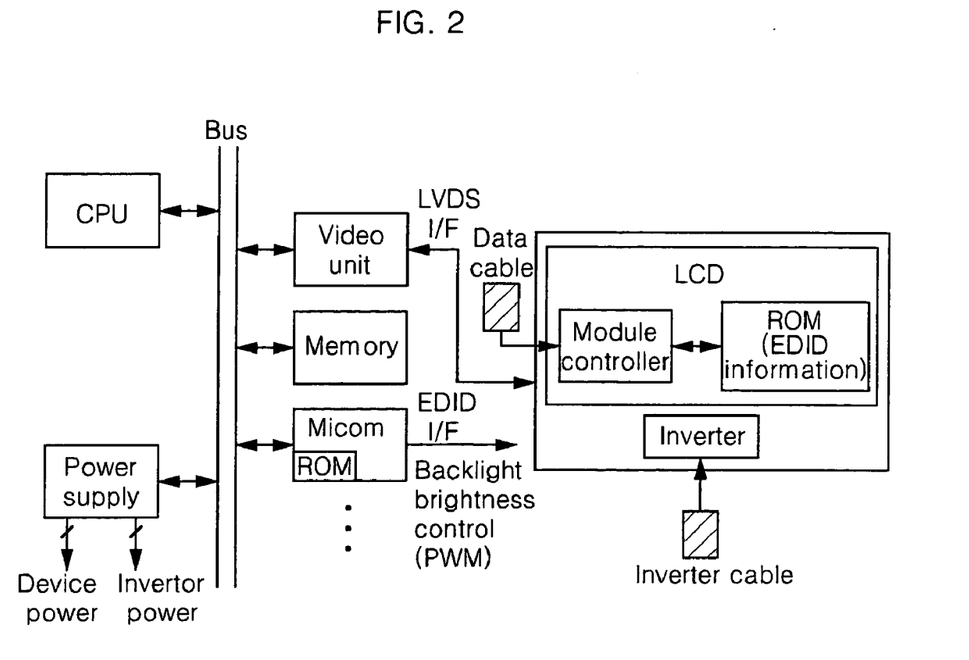
FIG. 2 is a block diagram schematically showing a preferred embodiment of a notebook computer provided with an LCD.

FIG. 2 is a block diagram of a preferred embodiment of a computer system provided with LCDs coupled thereto. As shown in FIG. 2, an inverter power is supplied to each LCD through an inverter cable by a control of a micom (microprocessor) corresponding to inherent control information (e.g., EEDID information) of each LCD, and the brightness of the LCDs are controlled according to manufacturers' or the LCDs' characteristics.

Figure 3:
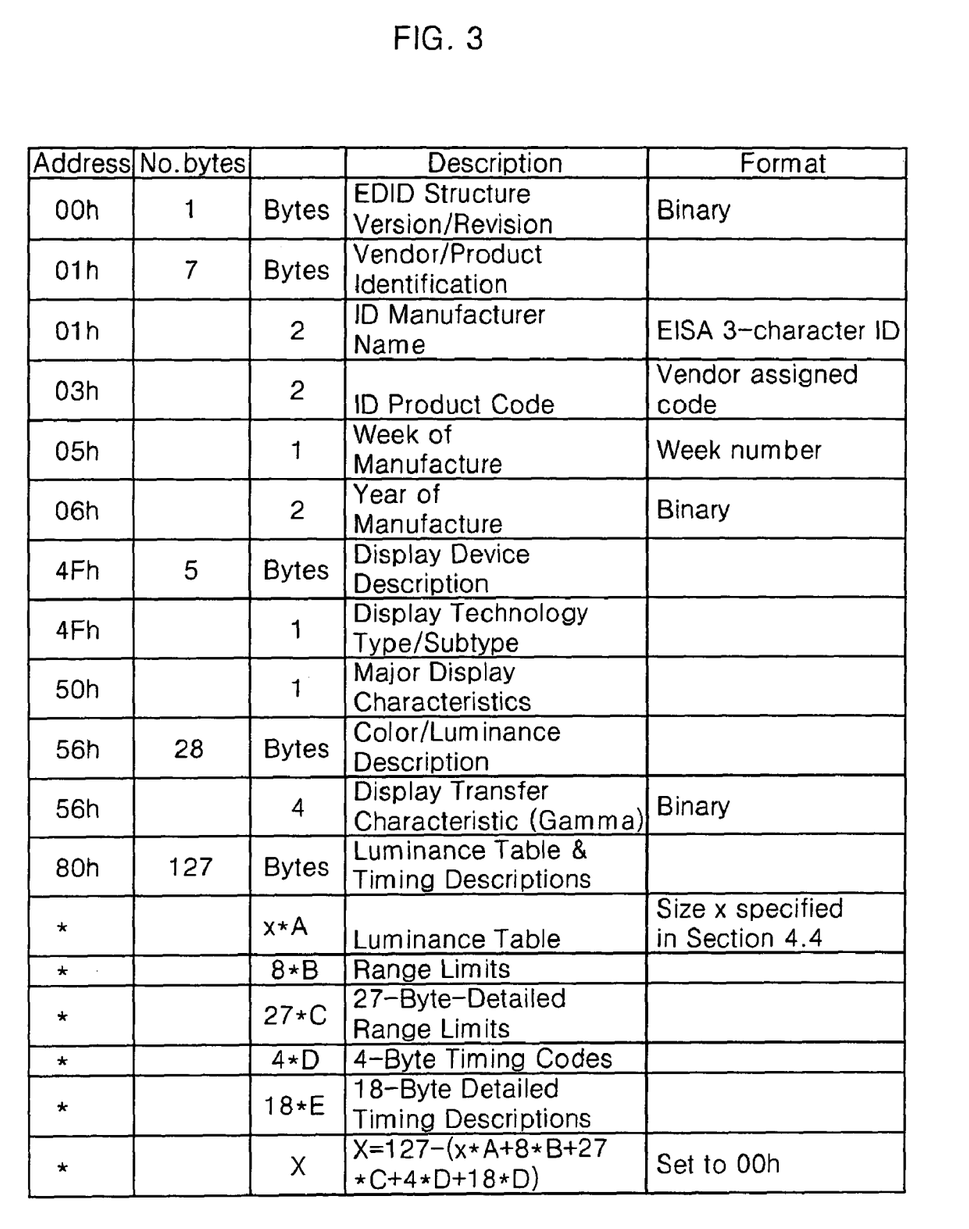
FIG. 3 shows a format of EEDID (Enhanced Extended Display Identification Data) configured in VESA standards and including brightness level control information of an LCD.

FIG. 3 shows a format of EEDID (Enhanced Extended Display Identification Data) configured in VESA (Video Electronics Standards Association) standards and including brightness level control information of an LCD. The format of the EEDID used in preferred embodiments of the present invention is substantially the same as that of the post-EDID. However, the present invention is not intended to be so limited.

As shown in FIG. 3, the brightness level control information of the LCD can include an LCD brightness level, an LCD brightness specification, control codes and inverter power (or inverter watt). The brightness level control information can be defined in the format of EDID (Extended display identification data) of the VESA standard or the like.

Such EDID informations can be stored in an inner memory of each LCD as a combined structure. For instance, when the manufacturers set the brightness control information to correspond to the vendor/product ID of each LCD, the system BIOS, operating system, application program or micom can read out the brightness control information through the LCD interface. The read brightness control information can be stored in the system memory. Thus, in accordance with preferred embodiments, it is possible to control a corresponding brightness from the stored information.

Alternatively, the LCD as a host can write the brightness control information in the system memory. Again, the system can use the recorded information to control a corresponding brightness.

Further, the stored information can be in the LCDs, a common memory for the LCDs, the micron or the system BIOS. However, the present invention is not intended to be so limited.

In addition, brightness level information of when the LCD is in a high temperature state can be provided within the EDID specification. To provide such information related with the temperature of the LCD is based on a principle in that as the temperature of the LCD rises, the brightness level rises too.

In order to provide the LCD with the brightness level information related with high temperature contained in the EDID specification, a temperature sensor is installed. The LCD temperature information sensed by the temperature sensor is provided to the system through the interface.

When a user continues to use the system, the system BIOS, operating system or micom can read (e.g., periodically and use the brightness level information related with the high temperature characteristic and the temperature information of the LCD. By doing so, when the temperature of the LCD rises to a high temperature, unnecessary power consumption is saved to thereby extend the battery life.

Figure 4:
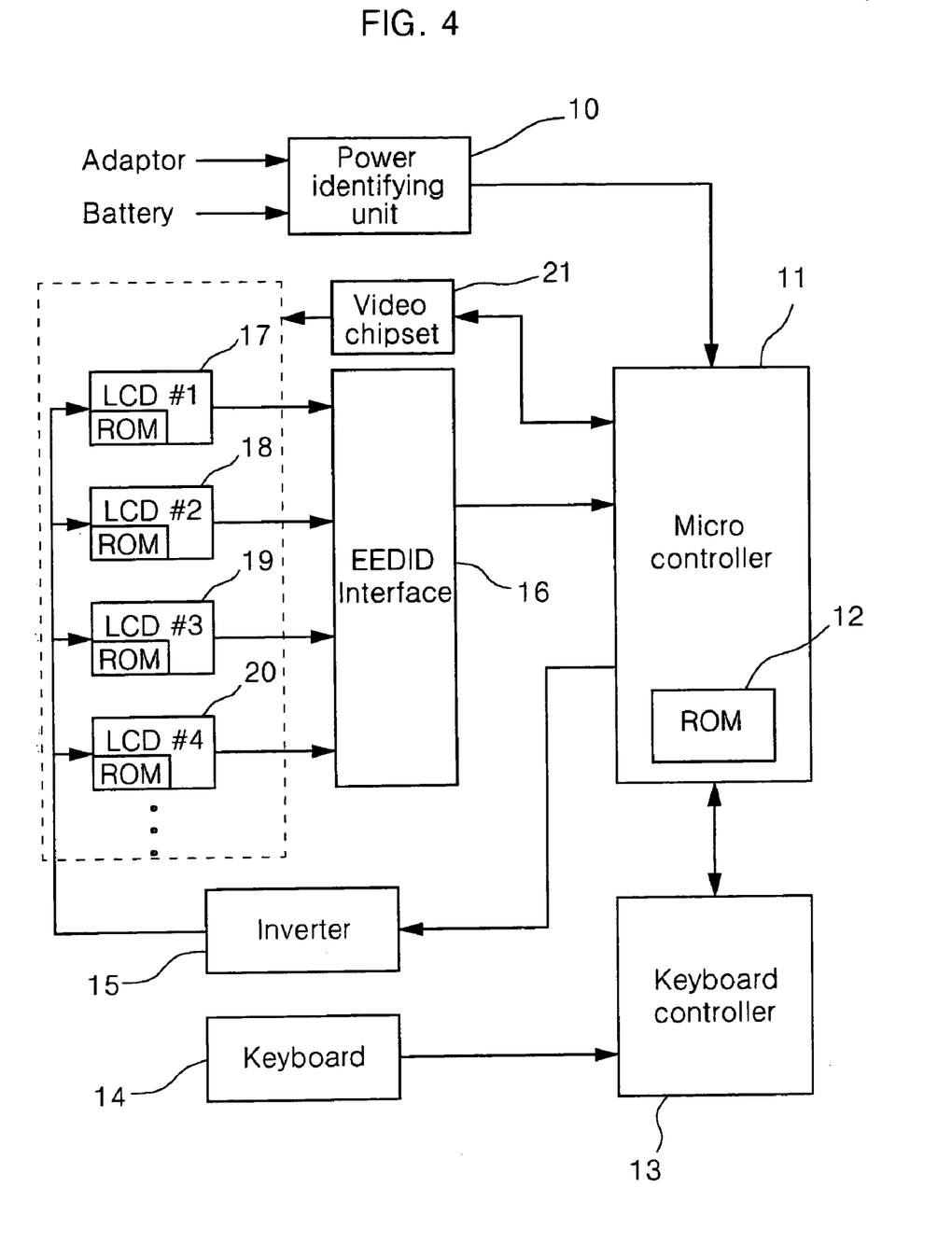
FIG. 4 is a block diagram of an apparatus for driving a plurality of LCDs according to a preferred embodiment of the present invention.

FIG. 4 is a block diagram showing an apparatus for driving a plurality of LCDs according to a preferred embodiment of the present invention. As shown in FIG. 4, an apparatus for driving a plurality of LCDs can include a power identifying unit 10 for identifying whether a used power is supplied through an adaptor or a battery to output a signal depending on the identified power, an EEDID interface 16 for checking ROMs of LCDs 17, 18, 19, 20 through an IIC bus to output EEDID data on the respective LCDs 17, 18, 19, 20, a keyboard 14 provided with keys for increasing or decreasing the brightness of the respective LCDs 17, 18, 19, 20, a keyboard controller 13 for outputting corresponding signals to key signals inputted through the keyboard 14 and a micro controller (or micom) 11. The micro controller 11 can convert the brightness information, which can be obtained from a ROM 12 of the micro controller 11 based on the LCDs identification information inputted from the EEDID interface 16, into a signal corresponding to the brightness information, (e.g., voltage signal or PWM (Pulse width modulation) signal) and output the converted signal. An inverter 15 is for receiving the voltage signal or PWM signal to provide driving currents to the respective LCDs 17, 18, 19, 20, and a video chipset 21 is for reproducing a video of each LCD.

In the above apparatus, the ROM 12 of the micro controller 11 can store the brightness control informations of the respective LCDs 17, 18, 19, 20 in the form of a table. However, the present invention is not intended to be so limited. Further, the micro controller 11, the keyboard controller 13 and the ROM 12 can be embodied by a microcomputer made in a construction of one chip.

Figure 5:
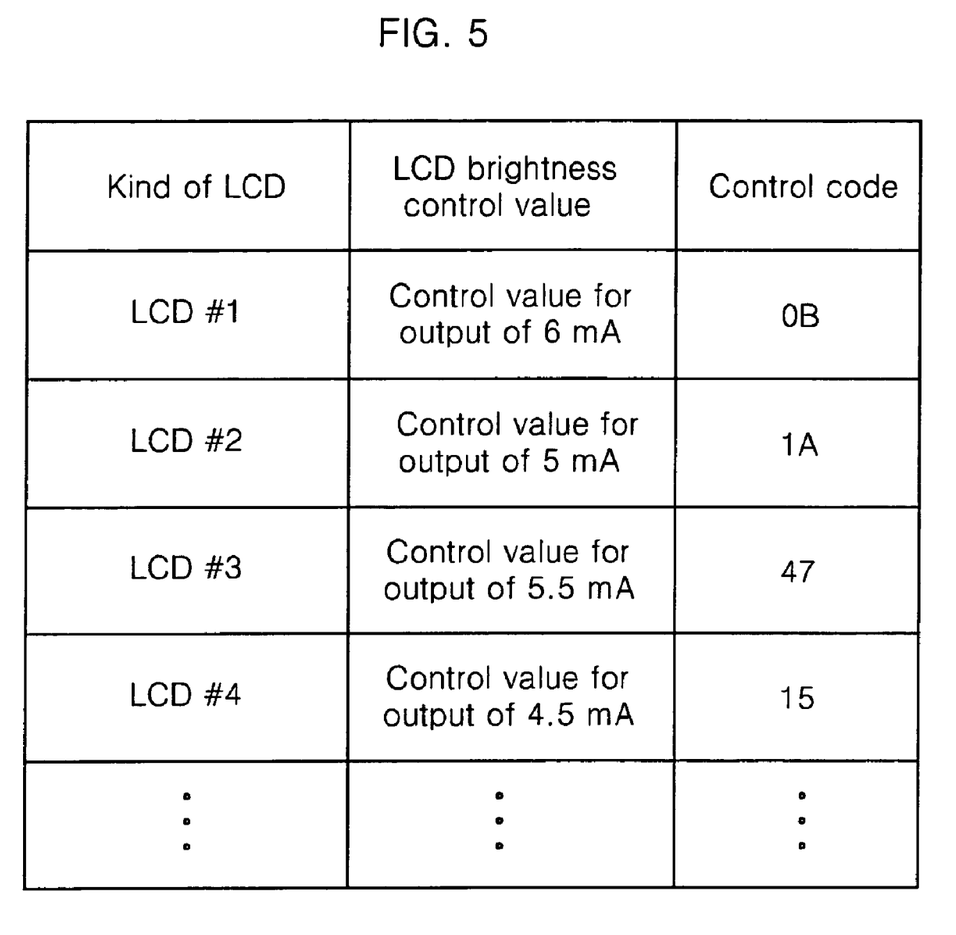
FIG. 5 is a table showing exemplary LCD-related information stored in the micro controller of FIG. 4.

FIG. 5 shows an exemplary memory map of a table showing LCD-related information stored in the micro controller of FIG. 4. As shown in FIG. 5, identification information (e.g., LCD# 1, LCD# 2, LCD# 3, LCD# 4, etc.) for identifying different LCDs (e.g., types or manufacturers) and control values (e.g., voltage/current value, control code) corresponding to the identification information are stored in the brightness control information table with a correlation.

The control values correspond to values for outputting driving currents of 6 mA, 5 mA, 5.5 mA, 4.5 mA, etc., that are necessary to output a light suitable for the specification of each LCD. The brightness control information table can be classified into and managed as a first and second LCD brightness control information.

The first LCD brightness control information is requested for the reference when the power is inputted through the adaptor. The second LCD brightness control information is requested as the reference when the power is inputted through the battery.

For instance, when it is assumed that the LCD brightness information of FIG. 5 is the adaptor mode, a user can limit the maximal value of the LCD brightness information from 6 mA to 3 mA when using only the battery. Such operations can reduce the power consumption in the inverter.

When one of the variety of LCDs that each store corresponding EEDID information thereof is equipped in the computer system described above, the EEDID interface 16 provides the micro controller 11 with the EEDID informations of the corresponding LCDs 17, 18, 19, 20. The EEDID informations can be provided by using the format of FIG. 3 or the like.

The micro controller 11 that receives the EEDID information preferably retrieves a corresponding table of the ROM 12 based on this EEDID information to read out a corresponding brightness control value, and converts the read brightness control value into a corresponding voltage signal or PWM signal. The micro controller 11 can then output the converted signal to the inverter 15.

The inverter 15 that receives the converted signals generates driving currents and outputs the generated driving currents to the corresponding LCDs 17, 18, 19, 20. Accordingly, the brightness of the corresponding LCDs 17, 18, 19, 20 is controlled.

Figure 6:
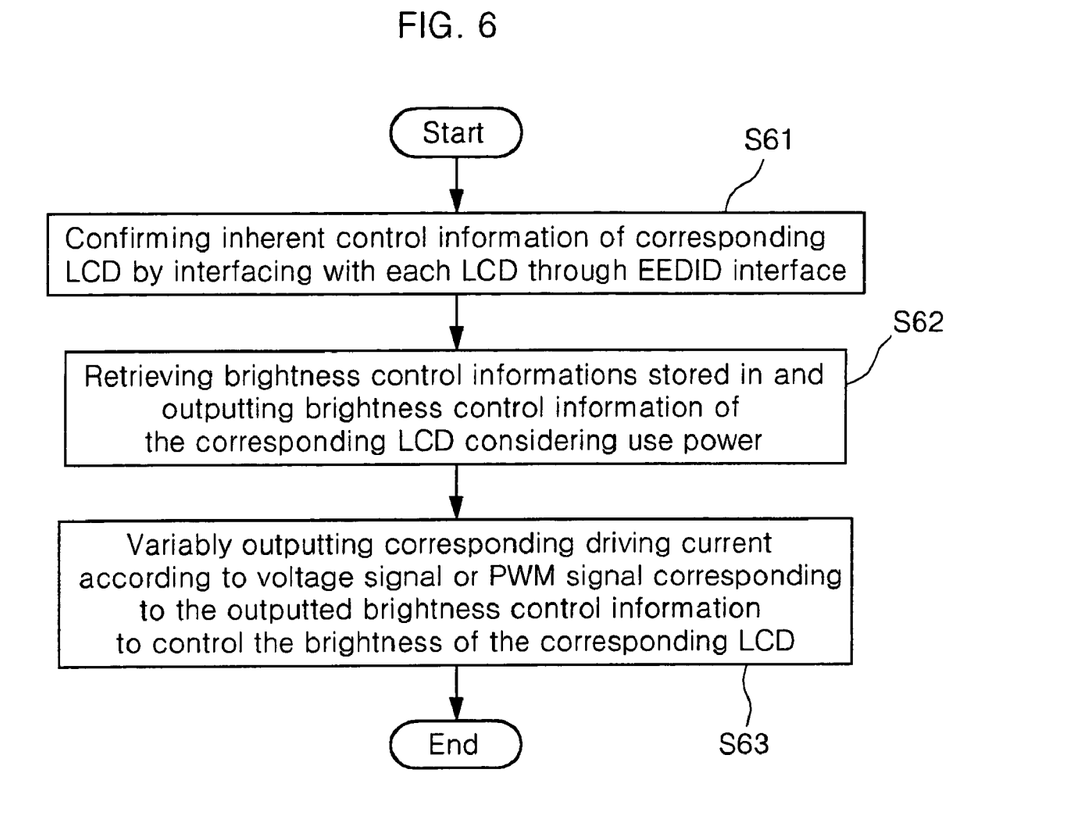
FIG. 6 is a flowchart illustrating an exemplary method for reading out the brightness control information from EEDID information stored in the respective LCDs and outputting corresponding control value.

FIG. 6 is a flowchart that shows a method for obtaining brightness control information according to a preferred embodiment of the present invention. As shown in FIG. 6, a procedure can read out the brightness control information from the EEDID information stored in the respective LCDs and output corresponding control values.

If a computer system provided with LCDs is turned on or a corresponding LCD is equipped, an inherent control information of the corresponding LCD is confirmed through an EEDID interface with the LCDs each having a ROM with the inherent control information thereof (step S61). The inherent information of each LCD can be stored in every LCD or stored commonly in one or more memories.

The inherent control information of the corresponding LCD and a plurality of brightness control informations, for example, stored in the micro controller are retrieved. Then, the brightness control information of the corresponding LCD is outputted (step S62).

A corresponding driving current is variably outputted according to a voltage signal or PWM signal corresponding to the outputted brightness control information. The corresponding driving current can control the brightness of the corresponding LCD (step S63), and the process ends.

As described above, the LCD brightness information outputted can be set differently depending on the power modes used. In other words, the micro controller 11 can apply different driving currents to the same LCD based on the information regarding whether the power (e.g., in use) inputted from the power identifying unit 10 is inputted through the adaptor, the battery or the like (e.g., system power levels).

Figure 7:
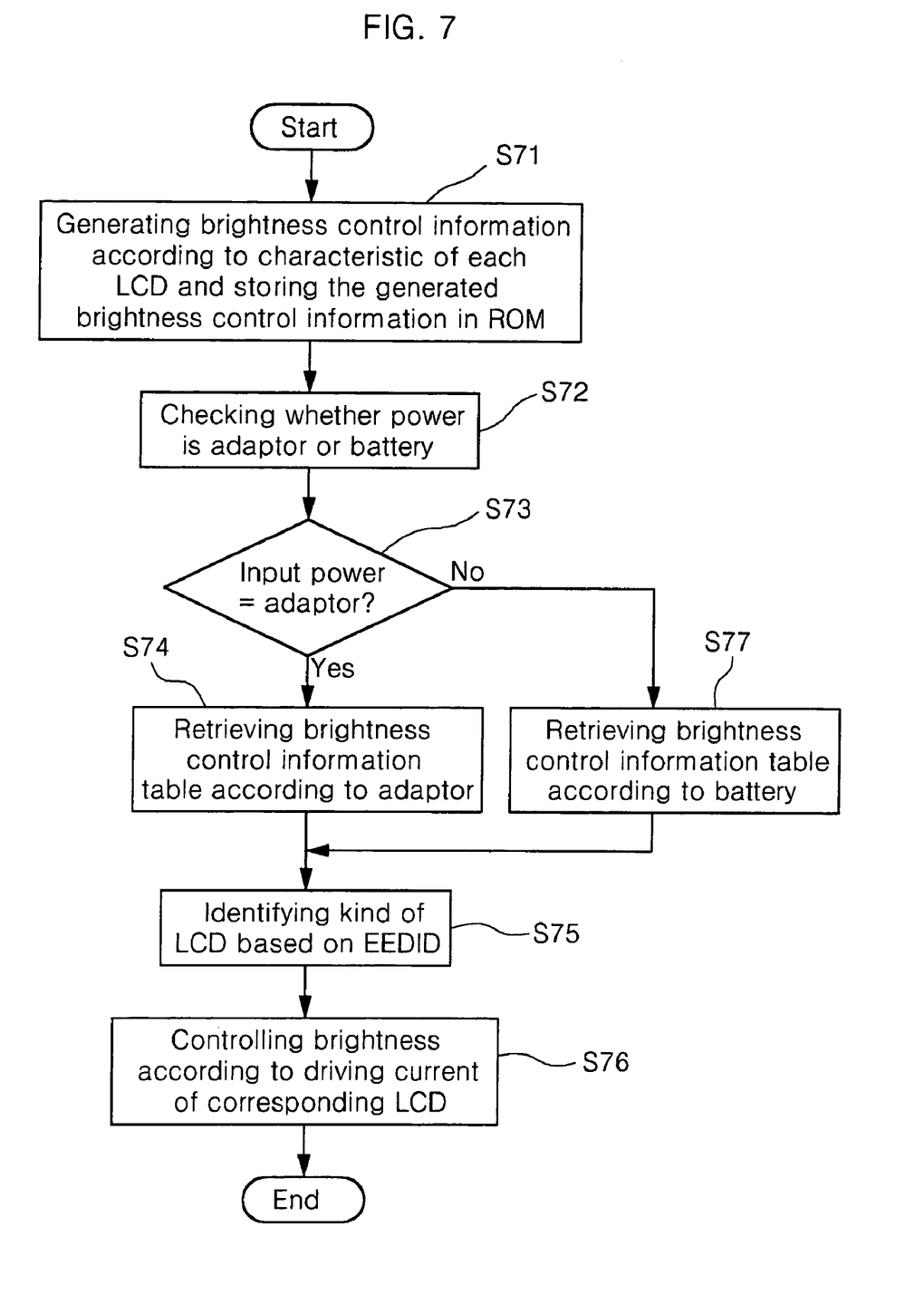
FIG. 7 is a flowchart illustrating a method for driving a plurality LCDs in a computer system according to a preferred embodiment of the present invention.

For example, if the LCD# 1 (17) is supplied its use power through the adaptor, the micro controller 11 outputs a control value such that the driving current value supplied to the LCD# 1 (17) is maintained at, for example, 6 mA However, if the LCD# 1 (17) is supplied its use power through the battery, the micro controller 11 outputs a control value such that the driving current value supplied to the LCD# 1 (17) is maintained at, for example, 3 mA FIG. 7 is a flowchart illustrating a first preferred embodiment of a method for driving a plurality LCDs in a computer system according to the present invention. As shown in FIG. 7, a method reads the brightness control information using the EEDID information stored in each LCD and outputs a corresponding control value.

In a driving method of a variety of LCDs in a computer system according to one embodiment, first, a user generates and inputs brightness control information suitable for the feature of each LCD (e.g., LCD type). For example, designers can program the inherent LCD ROM tables empirically by measuring output lights of the LCDs prior to programming the ROM tables.

As shown in FIG. 7, after a process starts, the micro controller 11 preferably stores the inputted brightness control information in the ROM 12 such that the inputted brightness control information correlates with the identification information of the corresponding LCD (step S71).

At this time, the user can divide the operational mode into the adaptor mode and the battery mode of the corresponding LCD in relation with kinds of power used. Further, the user can input the brightness control information differently according to the operational modes.

For instance, if the power in use is supplied through the adaptor, the user can set and input the brightness control information such that the maximum brightness rises to 150 nits. If the power is supplied through the battery, the user can set and input the brightness control information such that the brightness rises to 130 nits.

In a state that the LCD brightness control information is stored as described above, the micro controller 11 checks a current state of the power used (step S72). Then, the micro controller 11 can determine whether the power is supplied through, for example, the adaptor or the battery (step S73).

When it is determined that the power is supplied through the adaptor, the micro controller 11 retrieves the brightness control information according to the adaptor (step S74). The micro controller 11 identifies the kinds of the LCDs based on the self-information (EEDID) of the LCD in use (step S75). At this time, the micro controller preferably accepts the self-information of the LCD through the EEDID interface 16.

Then, the micro controller 11 that accepts the EEDID information outputs the brightness control information of the corresponding LCD based on the information on the kind of the identified LCD and the information on the supply source of the identified power from the ROM 12, to control the inverter 15 based on the brightness control information of the corresponding LCD. Accordingly, the brightness of the LCD can be controlled (step S76).

When it is determined that power is supplied from the battery (step S73), the micro controller 11 retrieves the brightness control information according to the battery (step S77) and identifies the kind of the LCD in use (step S75). The micro controller 11 can then output a corresponding brightness control information based on the retrieved brightness control information and the kind of the identified LCD from the ROM 12, and control the brightness of the LCD based on the outputted brightness control information (step S76).

Figure 8:
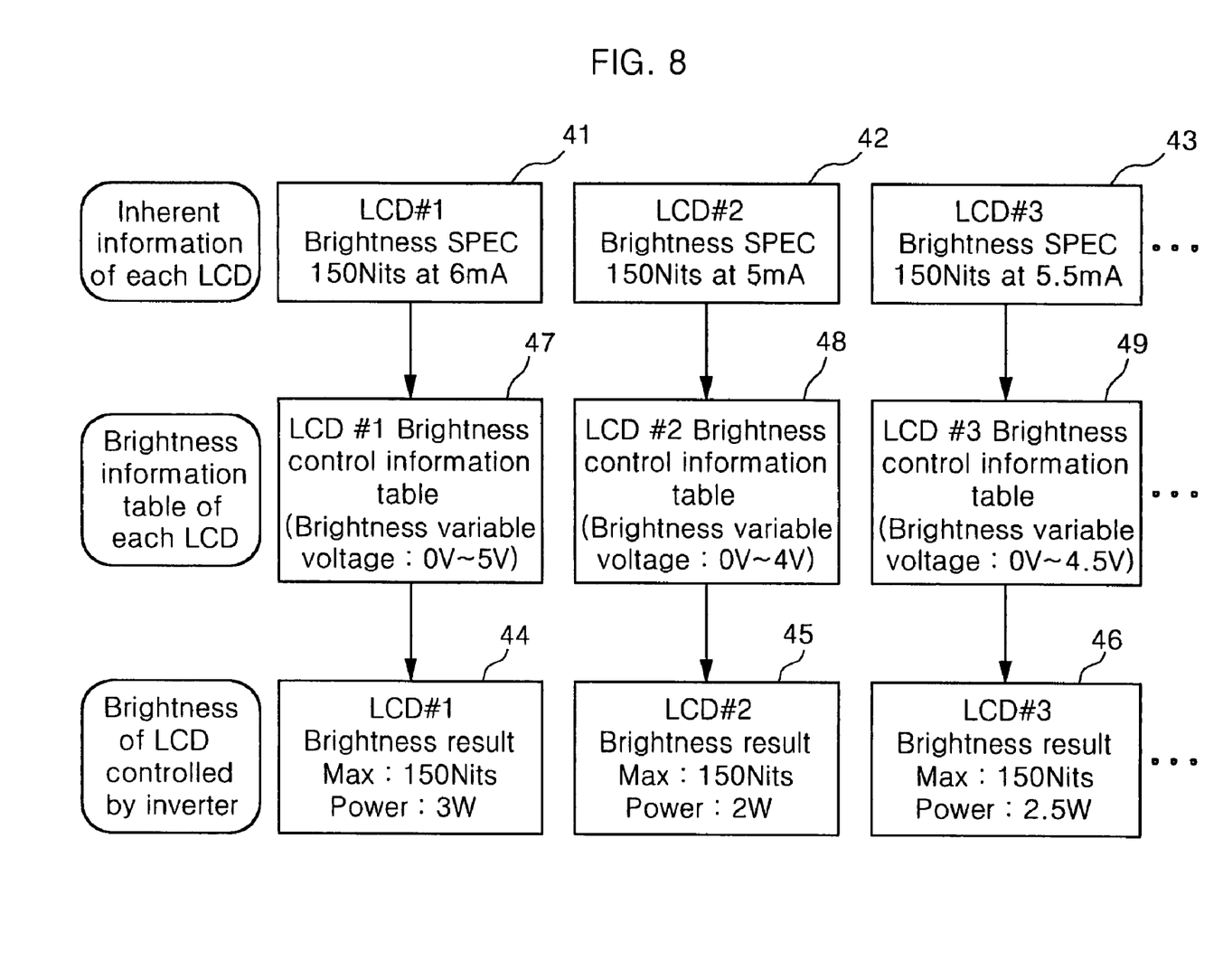
FIG. 8 is a block diagram for illustrating a method for driving a plurality of LCDs according to a preferred embodiment of the present invention.

FIG. 8 is a block diagram showing a second preferred embodiment of a method for driving a plurality of LCDs according to the present invention. As shown in FIG. 8, different kinds of LCDs 41, 42, 43 are respectively driven and controlled based on different brightness information tables 47, 48, 49 stored in the ROM 12 of the micro controller 11. As a result, it becomes possible to maintain the LCDs 41, 42, 43 at the same brightness with corresponding different power levels, for example, using a single inverter.

For example, LCD# 1 (41) consumes 6 mA to output the brightness of 150 nits, LCD# 2 (42) consumes 5 mA to output the brightness of 150 nits, and LCD# 3 (43) consumes 5.5 mA to output the brightness of 150 nits. When it is assumed that the brightness of the LCDs should be maintained at the level of 150 nits in the specification, the brightness control voltage of the LCD in the brightness control information table 47 corresponding to the LCD# 1 (41) is varied between 0 V to 5 V, the brightness control voltage of the LCD in the brightness control information table 48 corresponding to the LCD# 2 (42) is varied between 0 V to 4 V, and the brightness control voltage of the LCD in the brightness control information table 49 corresponding to the LCD# 3 (43) is varied between 0 V to 4.5 V.

Accordingly, the maximal consumption power in the LCD# 1 (41) becomes 3 W, the maximal consumption power in the LCD# 2 (42) becomes 2 W, and the maximal consumption power in the LCD# 3 (43) becomes 2.5 W. As shown in FIG. 8, the method can perform the brightness control of the corresponding LCD by generating different brightness control informations with respect to a variety of usable LCDs.

In yet another preferred embodiment according to the present invention, a single brightness control information on a specific LCD is stored at a predetermined area of the ROM 12 and a correction coefficient for each of the usable LCDs is inputted. Therefore, when the self-information is inputted from the LCD equipped currently through the EEDID interface 16, it is possible to correct the brightness control information based on the stored brightness control information and one or more correction coefficients and control the brightness of the corresponding LCD.

For example, a standard (e.g., single) brightness control information on a standard LCD (LCD# 1) is stored in the ROM 12, and a correction coefficient of another LCD (LCD# 2) set as 0.9, a correction coefficient of another LCD (LCD# 3) set as 0.8, and a correction coefficient of another LCD (LCD# 4) set as 0.7 are stored in the ROM. Then, when an LCD equipped currently is the LCD (LCD# 2), the brightness control information of the LCD (LCD# 2) is generated based on the brightness control information of the LCD (LCD# 1) and the corresponding correction coefficient (0.9) to control the brightness of the LCD (LCD# 2). In an apparatus for driving a plurality of LCD types using stored brightness control information and correction coefficients for specific LCD types, the standard brightness control information can be one or more. Further, the single brightness control information can be a generalized LCD value.

Figure 9:
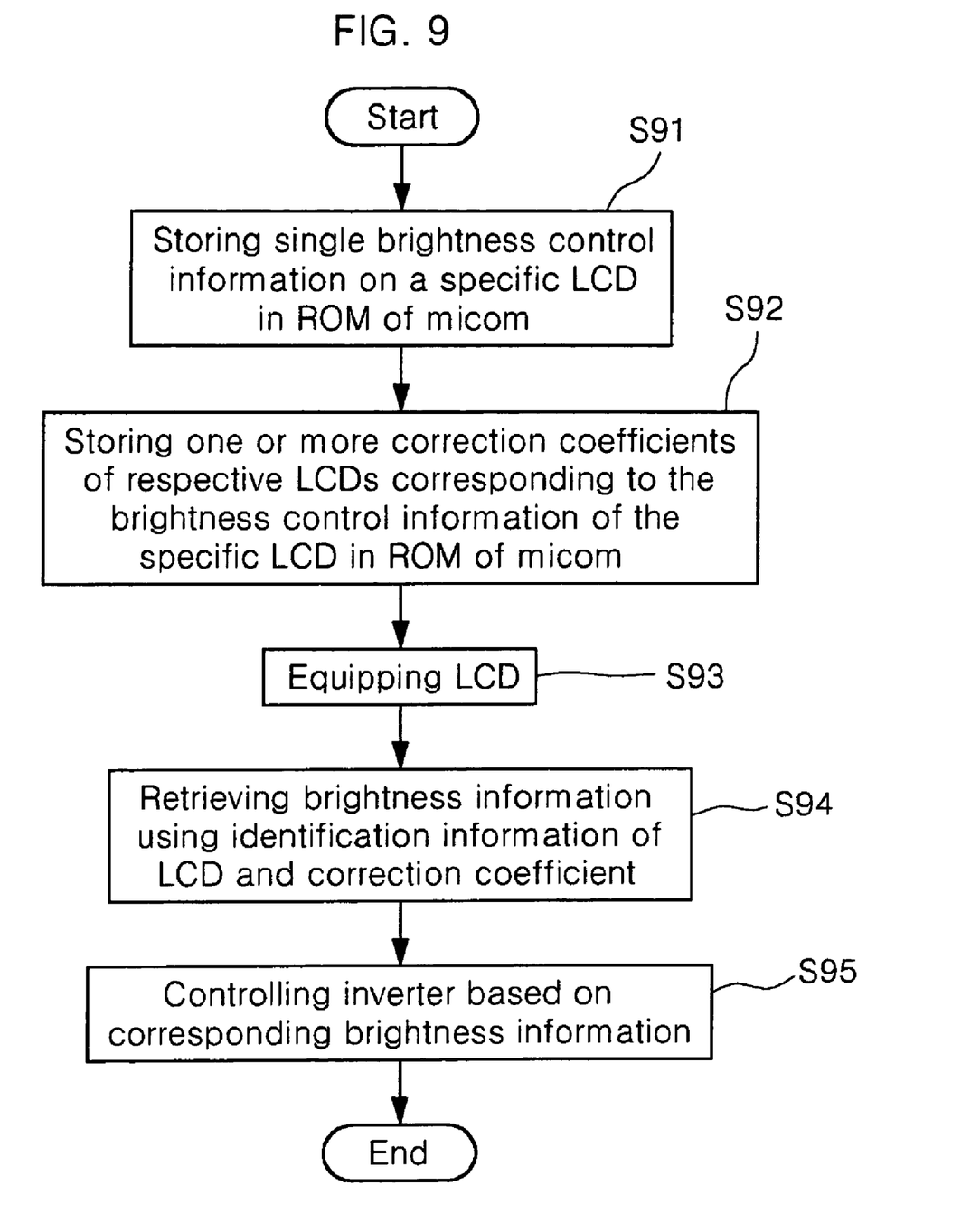
FIG. 9 is a flowchart showing a method to output the brightness control information using a correction coefficient according to another preferred embodiment of the present invention.

FIG. 9 is a flowchart showing a method to output the brightness control information using a correction coefficient according to an embodiment of the present invention. As shown in FIG. 9, after a process starts, a single brightness control information on a specific LCD is stored in the ROM of the micro controller (step S91).

One or more correction coefficients of the respective LCDs corresponding to the brightness control information of the specific LCD are stored in the ROM of the micro controller (step S92). Then, it can be determined whether or not an LCD is equipped.

When it is determined that the LCD is not equipped, the system is preferably placed in the standby state or the stop state. However, when it is determined that the LCD is equipped, the equipped LCD is determined from the inherent identification information of the LCD (e.g., as shown in FIG. 3) (step S93).

The brightness control information and correction coefficients (e.g., stored in the steps of S91 and S92) are applied to retrieve the brightness information of the equipped LCD (step S94). The micro controller controls the inverter based on the corresponding brightness information and thus controls the brightness of the LCD (step S95).

Figure 10:
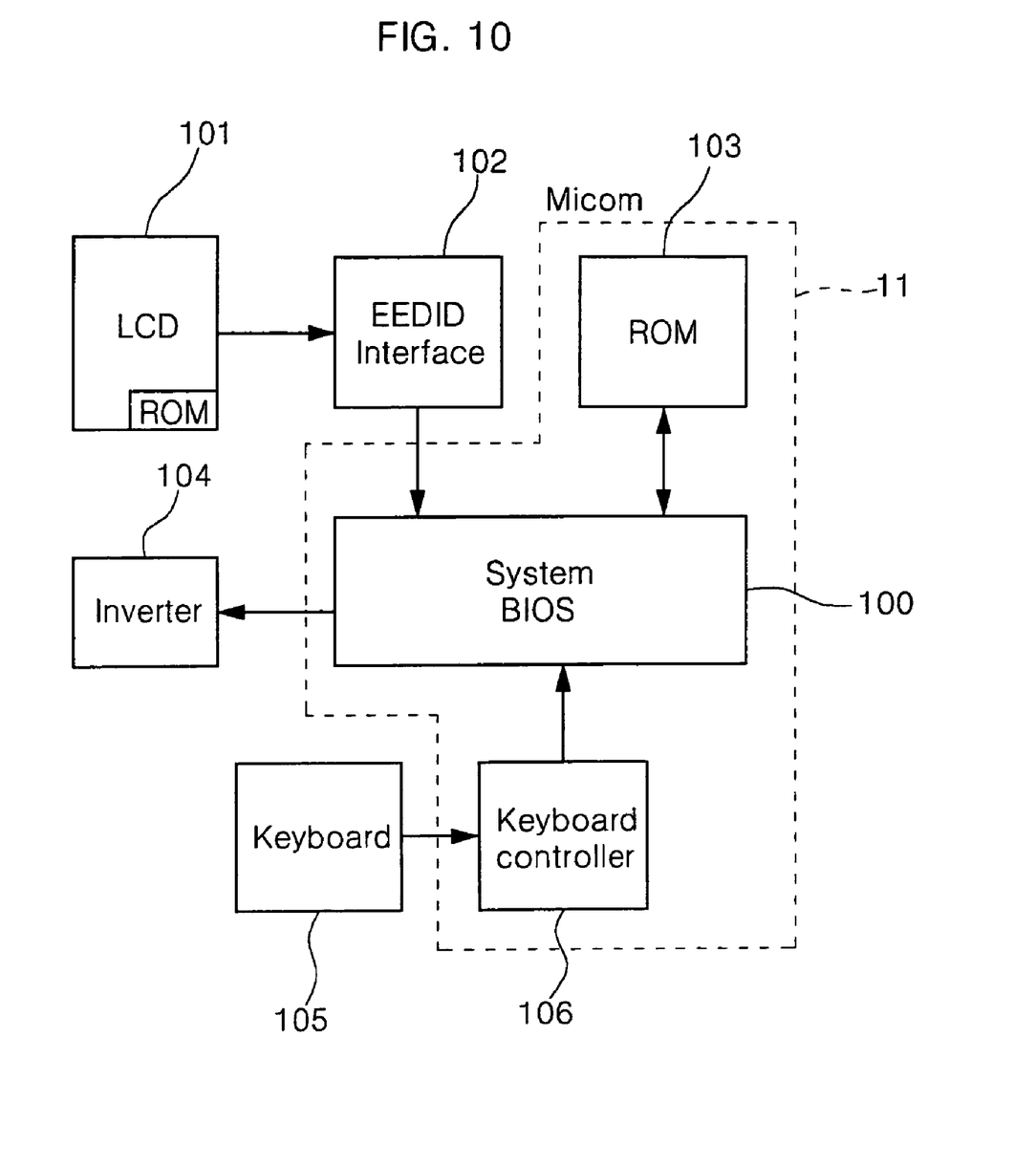
FIG. 10 is a block diagram of an apparatus for driving a plurality of LCDs in a computer system according to another embodiment of the present invention.

FIG. 10 is a block diagram of an apparatus for driving a plurality of LCDs in a computer system according to another embodiment of the present invention. As shown in FIG. 10, an apparatus for driving a plurality of LCDs can include an EEDID interface 102 for checking inherent identification information of each LCD stored in a ROM of an LCD 101, a ROM 103 storing the brightness control information of the LCD 101 (e.g., in the form of a table) and a keyboard 105 provided with keys for increasing or decreasing the brightness of the LCD 101. A keyboard controller 106 can output corresponding signals for key signals inputted through the keyboard 105. A system BIOS 100 can read out a corresponding brightness information based on the identification information of LCDs inputted from the EEDID interface 102 from the ROM 103 to convert the brightness information into a voltage signal or PWM signal and output the converted signal, and an inverter 104 can receive the voltage signal or PWM signal to provide a driving current to the LCD 101.

The LCD identification information (e.g., as shown in FIG. 3) can contain LCD manufacturers, size, resolution, ultra-mobile products (style B proposed by SPWG), standard thickness models (style A) and the like. In the apparatus for driving a plurality of LCDs in a computer system according to FIG. 10, the identification information stored in the ROM of the LCD 101 is provided to the system BIOS 100 through a DDC (display data channel), the EEDID interface or the like. The system BIOS 100 controls the brightness of the corresponding LCD 101 based on the identification information described above.

Operations of the apparatus shown in FIG. 10 will now be described. When a user wishes to change the brightness by using the brightness increase and decrease keys of the keyboard 105, the keyboard controller 106 determines the inputted key and the system BIOS 100 receives scanned data through an interrupt.

The system BIOS 100 controls the inverter 104 with a corresponding brightness control command based on the inputted data and the brightness control value and identification information of the LCD, which are preferably inputted in advance in the ROM 103 according to the kind of the LCD. Thus, the system BIOS controls the brightness of the LCD.

In other words, similar to a control method of the micro controller (micom) described above based on the LCD identification information, the system BIOS controls the brightness of the LCD by controlling the inverter with a brightness control command corresponding to the brightness control value. Further, the brightness control information can be stored in advance in the ROM.

Figure 11:
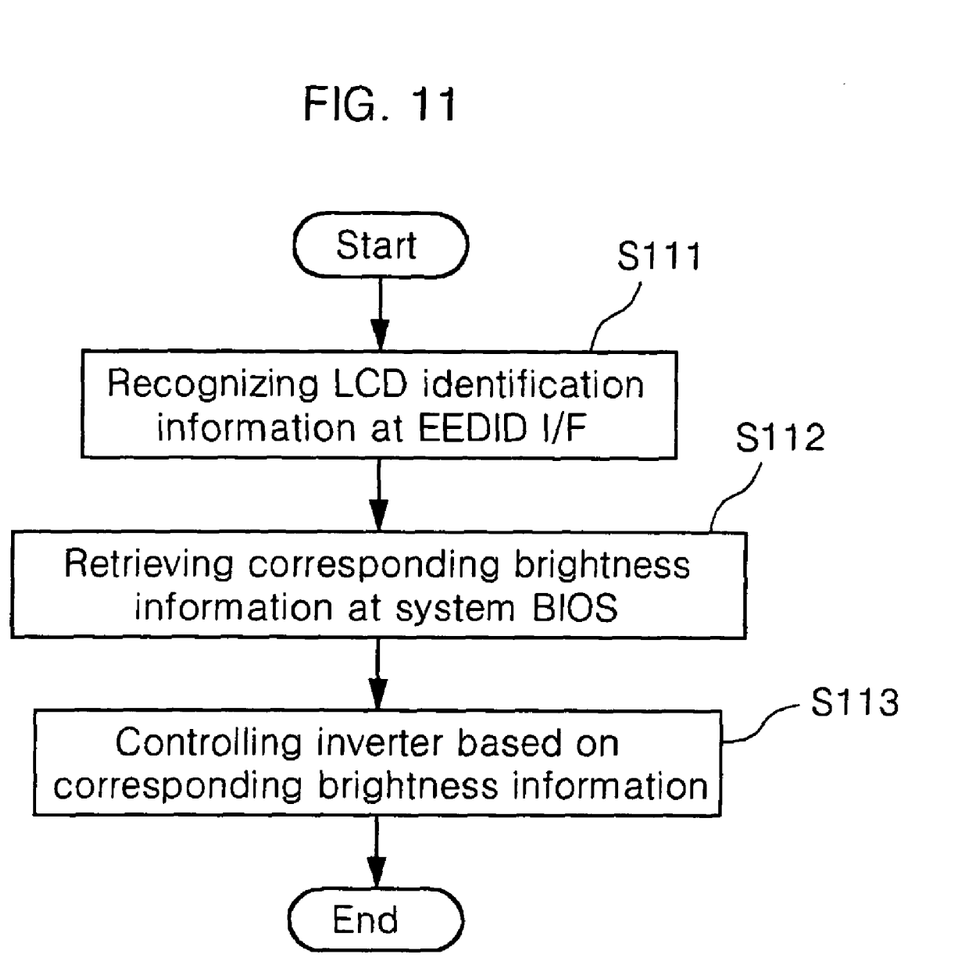
FIG. 11 is a flowchart illustrating a method for driving a plurality of LCDs in a computer system according to yet another embodiment of the present invention.

FIG. 11 is a flowchart illustrating a third preferred embodiment of a method for driving a plurality of LCDs in a computer system according to the present invention. As shown in FIG. 11, after a process starts, if the LCD 101 is equipped, the EEDID interface 102 checks the identification information of the corresponding LCD 101 and provides the checked identification information to the system BIOS 100 (step S111).

Afterwards, if the brightness increasing or decreasing command is inputted. by a user, the system BIOS 100 accepts the command preferably through an interrupt. At this time, the system BIOS 100 retrieves such an LCD identification information inputted from the EEDID interface 102 (e.g., shown in FIG. 3) and the brightness control values according to the kinds of the LCDs that are stored in advance (step S112).

Thereafter, the system BIOS 100 generates a corresponding brightness control command based on the retrieved LCD identification information and brightness control value to control the inverter. Thus, the brightness of the LCD (e.g., LCD 101) can be controlled (step S113).

As described above, preferred embodiments of a system and apparatus for driving a plurality of LCDs in a computer system have various advantages. Preferred embodiments of a system and apparatus for driving a plurality of LCDs can control brightness of a various kinds of LCDS at different levels by a single inverter based on brightness control information of the usable LCDs, or a specific LCD and correction coefficients thereof. Accordingly, brightness levels of the LCDs are evenly controlled. As a result, preferred embodiments provide portable computer systems with power saving effect reduce developing costs, increase productivity, and reduce costs of after services. Further, preferred embodiments of apparatus and methods for driving displays according to the invention can be applied to electronic devices provided with a display, in particular, PDPs, cellular phones or the like.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A computer system, comprising:
   an inverter configured to provide driving currents for each installed vendor display type of a plurality of display types;
   checking means for identifying vendor display types of at least two installed displays; and
   brightness control means for matching brightness control information corresponding to the vendor display types of the at least two installed displays among preset brightness control information for each of the plurality of display types, wherein the brightness control information is used to control the brightness of the at least two installed displays according to the driving currents provided by the inverter such that the at least two displays have an equal brightness.

2. An apparatus for driving a plurality of displays, comprising:
   driving means for providing driving currents to the plurality of display types of the displays, wherein the driving means outputs each of the driving currents corresponding to each display type such that a brightness level of each of the display types are equal;
   checking means for checking inherent control information of at least two of the displays;
   output means for confirming brightness control information corresponding to the inherent control information of a type of the at least two checked displays among preset brightness control information for each of the plurality of displays to output information to control brightness of the at least two checked displays; and
   conversion means for supplying information to the driving means to drive the at least two displays at a same brightness based on the output information of the output means.

3. The apparatus according to claim 2, further comprising means for identifying power modes used in the at least two checked displays and outputting signals corresponding to the identified power modes.

4. The apparatus according to claim 3, further comprising memory means for storing the inherent control information of the displays.

5. The apparatus according to claim 4, further comprising:
   input means for varying the brightness of one of the at least two checked displays; and
   input means-control means for outputting a corresponding signal to the input information of the input means, wherein the output information of the output means is a voltage signal or a pulse width modulation signal.

6. The apparatus according to claim 5, wherein the memory means, the output means and the input means-control means are made in a form of one chip.

7. The apparatus according to claim 4, wherein the output means is one of a system BIOS and a microcomputer.

8. A method for driving a plurality of displays, the method comprising:

determining a plurality of different prescribed brightness control informations by driving the plurality of displays using variable driving currents to respectively achieve a set of a plurality of different brightness levels for each of the plurality of displays;

confirming inherent control information of at least two displays;

retrieving the brightness control information corresponding to the confirmed displays among the prescribed brightness control informations; and variably controlling the brightness of the corresponding displays by using the retrieved brightness control information such that the at least two displays have a same brightness.

9. The method according to claim 8, wherein the brightness control informations are stored in advance to correspond to the inherent control information of display types of the displays.

10. The method according to claim 9, wherein the brightness control informations are stored to be identified depending on supply sources of power, and wherein the plurality of different prescribed brightness control informations are determined using a single inverter.

11. The method according to claim 10, wherein the output of the brightness control information comprises at least one of a voltage signal and a pulse width modulation (PWM) signal, wherein the supply sources of power include an adaptor or a battery, wherein the displays are mounted in a portable computer during manufacturing, and wherein the displays are LCDs.

12. The method according to claim 11, wherein the brightness of the corresponding display is controlled by variably outputting a driving current of the display according to output information of the brightness control information.

13. The method according to claim 8, wherein confirming the inherent control information comprises checking an identification information of the confirmed display and providing the checked identification information to a system BIOS, and wherein the retrieved brightness control information comprises brightness control values depending on kinds of displays stored in a memory at a system BIOS, and wherein the variably controlling comprises generating the retrieved brightness control information using at least one of the identification information and the brightness control values.

14. The method according to claim 8, wherein the confirming and the retrieving comprises:

storing brightness information for a specific display in a memory;

storing in the memory one or more correcting coefficients for remaining ones of the plurality of displays corresponding to the brightness information for the specific display; and applying the correcting coefficient for the confirmed display using the brightness information to output the brightness control information.

15. A method for driving a plurality of displays, the method comprising:

providing an inverter for outputting driving currents to a plurality of displays;

generating brightness control information suitable for display characteristics of each of the plurality of displays used with the inverter;

storing the generated brightness control information corresponding to self-information of each of the plurality of displays;

checking a power source in use to set the generated brightness control information according to the checked power source;

identifying kinds of the displays based on the self-information of each of the displays in use;

outputting the brightness control information of the corresponding displays based on the self-information about the kinds of the identified displays in use and the information about the checked power source to the inverter; and controlling the brightness of the displays in use using the inverter based on the outputted brightness control information, wherein the inverter outputs each of the driving currents corresponding to each kind of display such that a brightness level of each of the displays are equal.

16. A method for driving a plurality of displays, the method comprising:

interfacing with displays to confirm inherent information of the corresponding displays;

correcting brightness control information, which is stored in advance for a plurality of vendor display types of the displays using an inverter, based on the confirmed inherent information of the displays; and variably controlling the brightness of the corresponding displays using the inverter based on the corrected brightness control information, wherein the inverter outputs driving currents corresponding to each vendor display type such that the brightness of the displays are equal.

17. The method according to claim 16, wherein the correcting is performed at different correcting values according to supply sources of power coupled for use, and wherein the variably controlling controls the brightness of the corresponding displays to match a prescribed brightness of 150 nits.

18. A method for driving a plurality of displays, the method comprising:

determining brightness levels of the plurality of displays when respectively provided with a plurality of driving currents as brightness control information for each of the displays;

storing brightness control information for a specific display of the plurality of displays in a memory;

storing in the memory one or more correcting coefficients for other ones of the displays corresponding to the brightness control information for the specific display;

identifying a corresponding display by using inherent information of each display of the plurality of displays, and applying the correcting coefficient for the identified display using the brightness control information to output brightness information; and controlling brightness of the identified display by using the brightness information for the specific display and the correcting coefficient for the identified display.

19. The method according to claim 18, wherein the specific brightness control information includes brightness information of one or more display types, and wherein the plurality of displays are provided driving currents by a single inverter.

20. The method of claim 18, wherein the specific brightness control information is for a generalized display type or a generic display type, and wherein the displays are LCDs.

21. A computer system, comprising:
two display devices installed in the computer system;
a controller configured to determine brightness control information corresponding to a display type of each installed display device among preset brightness control information for each of a plurality of installable display types for driving the two display devices; and
a driving device equipped in the computer system configured to connect with and provide driving currents to each of the plurality of installable display types, wherein the driving device outputs each of the driving currents corresponding to the two display devices such that a brightness level of the two display devices are equal.

22. The computer system of claim 21, wherein the display type is a manufacturing vendor, and wherein each of the display types are provided a set of different brightness levels for a single set of driving currents.

* * * * *